(12) United States Patent
Aylesworth

(10) Patent No.: US 11,141,702 B1
(45) Date of Patent: Oct. 12, 2021

(54) MULTI-FUNCTIONAL MULTI-LAYER HOLLOW FIBER MEMBRANE CONTAINING EMBEDDED MAGNETIC PARTICLES

(71) Applicant: Terrence W. Aylesworth, Algonquin, IL (US)

(72) Inventor: Terrence W. Aylesworth, Algonquin, IL (US)

( * ) Notice: Subject to any disclaimer, the term of this patent is extended or adjusted under 35 U.S.C. 154(b) by 0 days.

(21) Appl. No.: 16/152,406

(22) Filed: Oct. 4, 2018

(51) Int. Cl.
| | | |
|---|---|---|
| *B01D 69/08* | (2006.01) | |
| *B01D 69/12* | (2006.01) | |
| *B01D 69/02* | (2006.01) | |
| *B01D 69/14* | (2006.01) | |
| *C02F 1/44* | (2006.01) | |
| *C02F 1/48* | (2006.01) | |
| *B01D 61/00* | (2006.01) | |
| *C02F 103/08* | (2006.01) | |

(52) U.S. Cl.
CPC ......... *B01D 69/081* (2013.01); *B01D 61/002* (2013.01); *B01D 69/02* (2013.01); *B01D 69/12* (2013.01); *B01D 69/141* (2013.01); *C02F 1/445* (2013.01); *C02F 1/481* (2013.01); *B01D 2325/46* (2013.01); *C02F 2103/08* (2013.01)

(58) Field of Classification Search
CPC .. B01D 69/081; B01D 61/002; B01D 69/141; B01D 69/02; B01D 69/12; B01D 2325/46; C02F 1/481; C02F 1/445; C02F 2103/08
USPC ....................................................... 210/223
See application file for complete search history.

(56) References Cited

U.S. PATENT DOCUMENTS

| | | | | |
|---|---|---|---|---|
| 2,604,207 | A * | 7/1952 | Scott .................. | B03C 1/18 209/218 |
| 2,893,561 | A * | 7/1959 | Duzich ................ | B01D 35/06 210/223 |
| 4,836,932 | A * | 6/1989 | Walsh ................ | B01D 21/0009 210/223 |
| 5,078,871 | A * | 1/1992 | McCready ........... | B01D 35/06 184/6.25 |
| 8,574,439 | B2 * | 11/2013 | Shiire ................. | C02F 1/288 210/662 |
| 9,242,213 | B1 * | 1/2016 | Aylesworth ......... | C02F 1/442 |
| 9,309,132 | B2 * | 4/2016 | Tarabara ............. | B01D 17/085 |
| 9,334,748 | B1 * | 5/2016 | Aylesworth ......... | C02F 1/442 |
| 2006/0191834 | A1 * | 8/2006 | Fuchs ................. | B01D 35/06 210/222 |
| 2008/0035541 | A1 * | 2/2008 | Franzreb ............ | B01D 61/002 210/137 |
| 2009/0238764 | A1 * | 9/2009 | Takeyama ........... | A61K 9/1694 424/9.3 |
| 2013/0277305 | A1 * | 10/2013 | Stetson, Jr. ......... | B01D 65/02 210/636 |

(Continued)

*Primary Examiner* — Claire A Norris
*Assistant Examiner* — Ekandra S. Miller-Cruz
(74) *Attorney, Agent, or Firm* — David A. Gottardo

(57) ABSTRACT

This invention relates to a dual-layer, multifunctional hollow fiber membrane having at least two layers that perform two respective functions: 1) a layer that performs a separative function separating a solvent such as a liquid or gas from its solute species; and 2) a layer that performs the function of generating a magnetic field. The layer generating the magnetic field preferably has magnetic nano or micro particles embedded therein to attract, capture and/or position paramagnetic draw solute particles to maximize their osmotic effect.

19 Claims, 2 Drawing Sheets

(56) References Cited

U.S. PATENT DOCUMENTS

| | | | |
|---|---|---|---|
| 2014/0120570 A1* | 5/2014 | Yu .................... | G01N 15/1425 |
| | | | 435/29 |
| 2014/0305874 A1* | 10/2014 | Stein .................... | B01J 20/324 |
| | | | 210/695 |
| 2016/0016127 A1* | 1/2016 | Mentzel ............... | B01D 61/002 |
| | | | 415/121.3 |
| 2016/0326029 A1* | 11/2016 | Park .................... | B01D 61/04 |

* cited by examiner

MULTI-FUNCTIONAL MULTI-LAYER HOLLOW FIBER MEMBRANE CONTAINING EMBEDDED MAGNETIC PARTICLES

CROSS REFERENCE TO RELATED APPLICATIONS

This application claims priority to U.S. Provisional Application Ser. No. 62/658,311 filed on Oct. 4, 2017.

TECHNICAL FIELD OF THE INVENTION

This invention relates generally to multi-functional, multi-layer hollow fiber, thin film composite membranes (TFC or TFM) used in both Forward Osmosis (FO) and Pressure Retarded Osmosis (PRO) applications. More specifically, the invention relates to a dual-layer, multifunctional hollow fiber membrane having at least two layers that perform two respective functions: 1) a layer that performs a separative function separating a solvent such as a liquid or gas from its solute species; and 2) a layer that performs the function of generating a magnetic field. The layer generating the magnetic field preferably has magnetic nano or micro particles embedded therein to attract, capture and/or position paramagnetic draw solute particles to maximize their osmotic effect. This membrane-embedded magnetic field may optionally be selectively increased or decreased by an additional, external magnetic field.

BACKGROUND OF THE INVENTION

Osmosis is the spontaneous net movement of solvent molecules through a selectively permeable membrane into a region of higher solute concentration, in the direction that tends to equalize the solute concentrations on the two sides. The selectivity of the membrane allows for the permeability of the solvent but not the solute. This invention focuses on the use of a magnetic nanoparticle as a solute. Thus, both the physical position and the concentration of the magnetic solute particles can be controlled in order to affect a desired membrane/solution function.

Forward osmosis (FO) systems utilize a semi-permeable membrane to effect separation of water from dissolved solutes. The driving force for this separation is an osmotic pressure gradient, such that a "draw" solution of high concentration (relative to that of the feed solution), is used to induce a net flow of water through the membrane into the draw solution, thus effectively separating the feed water from its solutes. A pressure retarded osmosis (PRO) system is a method of generating pressure and with the use of a hydro-turbine, energy. The pressure differential results from different salinity gradients.

The most popular and most documented sources of water having different salinities is fresh river water, and seawater, likely because of ready availability of great volumes of these water sources (due to so many rivers flowing into oceans throughout the world) and their resulting vast energy generation possibilities. However, the two sources of water of in this invention are 1) pure water, and 2) pure water with a colloidal dispersion of magnetic nanoparticles. The water sources can be characterized as ultra-pure de-ionized, closed-loop, (not opened to the outside environment) and sterile (not allowing any microbes to proliferate), with and without the magnetic nanoparticles.

FO systems are utilized by many industries, to include the water treatment industry, medical or biological industry and the food and beverage industry. Water treatment uses of FO systems include the desalinization of seawater, demineralization of industrial cooling water, and the treatment of wastewater. Medical or biological uses of FO systems include hemodialysis (artificial kidney), blood oxygenation (artificial lung), regulation of blood glucose levels (the control of diabetes, i.e. artificial pancreas), and control of drug delivery (membrane diffusion-controlled drug release systems). Food and beverage uses of FO hollow fiber membrane systems include the clarification of beverages, as well as the concentration of beverages through de-watering. PRO systems are utilized by the power generation industry, which harvests the energy produced by pressure (or "salinity gradient power") differential compensation.

FO and PRO systems have been improved via the use magnetic fields acting on magnetic nanoparticle draw solutions. See U.S. Pat. No. 9,242,213 (Forward Osmosis Using Magnetic Nanoparticle Draw Solution); U.S. Pat. No. 9,334,748 (PRO System Using a Hollow Fiber Membrane with Superparamagnetic Nanoparticle Draw Solution); U.S. Pat. No. 10,038,331 (PRO Unit to Continuously Recharge the Battery of an Electric Conveyance); U.S. patent application Ser. No. 15/005,600 (Osmosis System Using a Magnetic Nanoparticle Draw Solution and Permanent Ring-Type Magnets). Each of the aforementioned patents and applications utilizes submerged hollow fiber membranes with a superparamagnetic nanoparticle draw solution. Each also utilizes one or more magnets to create the magnetic field necessary to move, position or control the location of the magnetic draw solute particles for the creation of the osmotic pressure necessary to transport a fluid through the hollow fiber membrane. Such magnets, however, tend to be heavy, occupy valuable space within a given membrane system, and/or require a source of electricity to create the necessary magnetic field.

The present invention overcomes the foregoing disadvantages by embedding permanent magnetic nano ($1 \times 10^{-9}$ meter) or micro ($1 \times 10^{-6}$ meter) particles (i.e., magnets) within the hollow fiber membrane itself to create the magnetic field necessary to attract and position the magnetic draw particle to the membrane. This membrane-embedded magnetic field may optionally be selectively increased or decreased by an additional, external magnetic field.

SUMMARY OF THE INVENTION

This invention relates generally to multi-functional, multi-layer hollow fiber, thin film composite membranes (TFC or TFM) used in both Forward Osmosis (FO) and Pressure Retarded Osmosis (PRO) applications. More specifically, the invention relates to a dual-layer, multifunctional hollow fiber membrane having at least two layers that perform two respective functions: 1) a layer that performs a separative function separating a solvent such as a liquid or gas from its solute species; and 2) a layer that performs the function of generating a magnetic field. The layer generating the magnetic field preferably has magnetic nano or micro particles embedded therein to attract, capture and/or position paramagnetic draw solute particles to maximize their osmotic effect. This membrane-embedded magnetic field may optionally be selectively increased or decreased by an additional, external magnetic field.

The multifunctional hollow fiber membrane for osmosis comprises a hollow center, an inner membrane layer encircling and coaxial with the hollow center, and an outer membrane layer encircling and coaxial with the inner membrane layer, the outer layer embedded with a plurality of magnetic particles to create a magnetic force. In one embodiment, the hollow center contains a solution of superparamagnetic draw particles therein while in another embodiment the hollow center contains a colloidal dispersion of superparamagnetic draw particles.

The multifunctional hollow fiber membrane has a tunable magnetic force. In one embodiment, the magnetic force is tuned by adjusting a relative concentration of the plurality of magnetic particles while in another embodiment the magnetic force is tuned by altering a thickness of the outer membrane layer. The magnetic particles of the outer layer comprise spherical particles, elongated particles, or a combination of both while the magnetic force generated by the magnetic particles is either radial or axial.

DESCRIPTION OF THE EMBODIMENTS

This invention relates generally to multi-functional, multi-layer hollow fiber, thin film composite membranes (TFC or TFM) used in both Forward Osmosis (FO) and Pressure Retarded Osmosis (PRO) applications. More specifically, the invention relates to a dual-layer, multifunctional hollow fiber membrane (HFM) comprising at least two layers that perform two respective functions: 1) a layer that performs a separative, sieving, straining function separating a solvent such as a liquid or gas from its solute species, because the fiber's pore diameter size is smaller than dissolved particles in the feed solution; and 2) a layer that performs the function of generating a magnetic field. The layer generating the magnetic field preferably has magnetic nano or micro particles embedded therein to attract, capture and/or position paramagnetic draw solute particles to maximize their osmotic effect.

Figure 1:
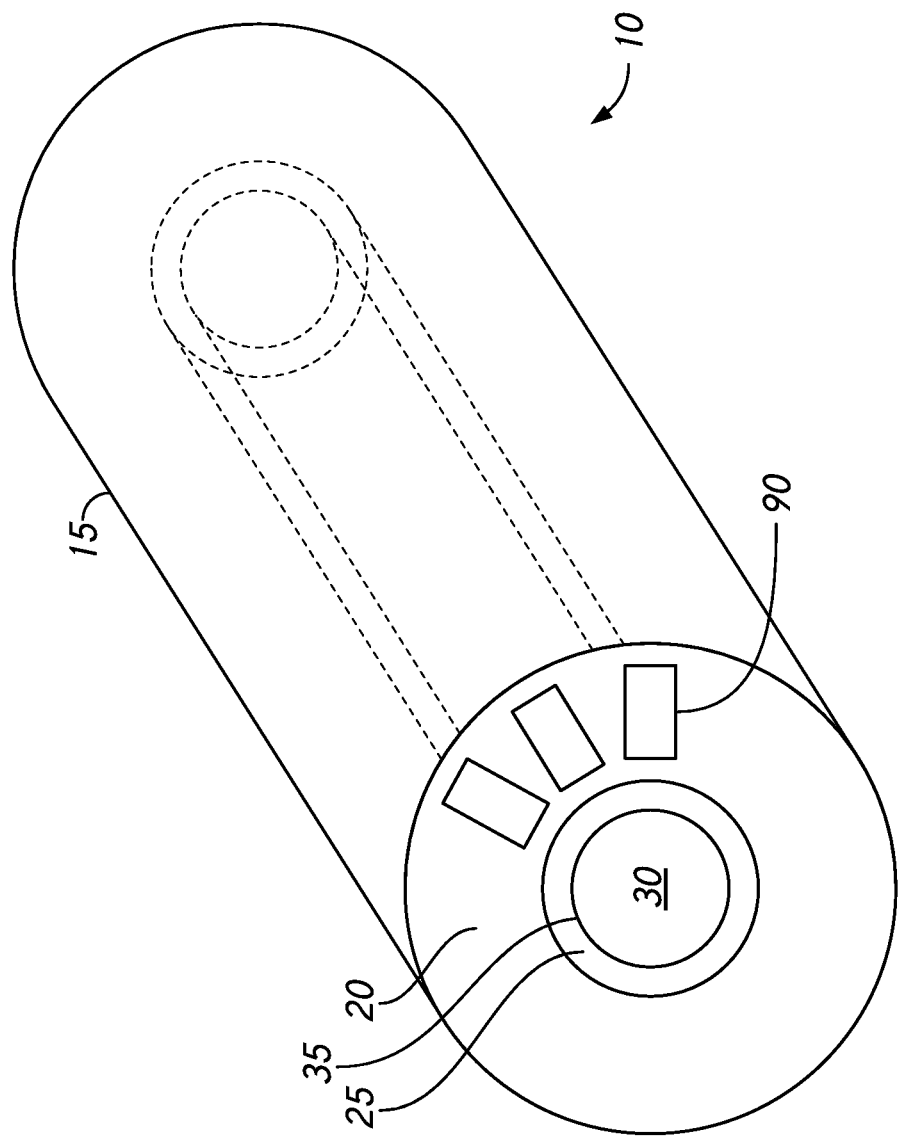
FIG. 1 is a perspective schematic view of an embodiment of the hollow fiber membrane segment having magnetic particles embedded therein.

Referring to FIG. 1, a segment of an embodiment of the multifunctional hollow fiber membrane 10 is shown. While a segment of hollow fiber membrane 10 of finite length is illustrated in FIG. 1, it is understood that hollow fiber membrane can have any length. The hollow fiber membrane 10 comprises a hollow center 30, an inner membrane layer 25 that encircles and is coaxial with the hollow center, and an outer membrane layer 20 that encircles and is coaxial with inner membrane layer. A plurality of magnetic particles 90 are preferably embedded throughout the outer membrane layer 20. The hollow center 30, contains the superparamagnetic nanoparticle draw solution therein. It provides a channel for the incoming permeate to flow to its collection location.

Outer membrane layer 20 is highly water-porous to bulk salinated water that is in fluid communication with the outer membrane layer's outer surface 15. The porous structure of the outer membrane layer permits the salinated water to flow from its outer surface 15, through the membrane and to the inner membrane layer 25. Inner membrane layer 25 is preferably comprised of cellulose acetate, various other cellulosic polymers, polysulfone, polyethersulfone, polyetherimide, polyvinylidene, polysulfones, polyolefins, polyimides, chlorinated polymers, fluoro polymers and/or polysiloxane-polyamide copolymers and acts as a separative layer between the hollow center 30 and outer membrane layer 20. The inner membrane layer 25 provides a sieving function for the salinated water flowing into it from the outer membrane layer 20 to separate dissolved ionic solids, such as sodium and chloride, from the salinated water such that only pure water (i.e., permeate) is permitted to flow into the hollow center 30. The positioning and placement of the draw solute particles at the inside surface 35 of the semi-permeable membrane maximizes the osmotic transport of solvent from the outside of the HFM and through the membrane to the inside.

The outer membrane layer 20 is preferably constructed of either organic polymer, or inorganic materials. The most common polymer membrane materials, owing to their competitive performance and economic characteristics are (but are not limited to): cellulose acetates; cellulose nitrates; cellulose esters (CA, CN, and CE); polysulfone (PS); polyester sulfone (PES); polyacrilonitrile (PAN); polyamide; polyimide; polyethylene and polypropylene (PE and PP); polytetrafluoroethylene (PTFE); polyvinylidene fluoride (PVDF); and polyvinylchloride (PVC). The most common inorganic (ceramic or metallic) membranes are made of a metal and a non-metal oxide, nitride and/or carbide. These include: alumina ($Al_2O_3$, including aloxide, aloxite, or alundum); titania ($TiO_2$, or titanium dioxide); zirconia oxide ($ZrO_2$, also known as zirconia or zirconiumoxide); silicon carbide (SiC, also known as carborundum); other glassy materials; tungsten; palladium; and stainless steel.

Referring again to FIG. 1, the outer membrane layer 20 preferably holds a plurality of magnetic particles 90 homogenously dispersed therein. In one embodiment, the magnetic particles (or the magnetic powders embedded in the outer membrane layer) comprise several different material types: ferrite (also known as ceramic, $BaFe_2O_3$ or $SrFe_2O_3$); alnico (Al—Ni—Co); samarium cobalt ($Sm_1Co_5$ or $Sm_2Co_1$?); neodymium iron boron ($Nd_2Fe_{14}B$), and the various combinations of different concentrations); or nitride ($Fe_{16}N_2$). Of the foregoing materials, ferrite materials are preferred due to their low corrosion potential and ease of magnetization (i.e., it requires a lower magnetization energy to fully magnetically saturate the materials). In another embodiment, the magnetic particles preferably comprise or rare-earth elements such as lanthanide (with atomic numbers 57 through 71), scandium and yttrium); maghemite ($Fe_2O_3$) and magnetite ($Fe_3O_4$); praseodymium; neodymium nano (1-100 nanometer); or micro (1-100 micrometers) particles.

In yet another embodiment, the magnetic particles may comprise bonded magnets—a recent and very quickly developing segment of the magnet industry—comprising magnetic powders combined with various polymers or binder types to produce magnets having a flexible form. Such bonded magnets are made using magnetic powders such as ferrite, neodymium-iron-boron (NdFeB or "neo"), samarium-cobalt, alnico, or mixtures (hybrids) thereof. Regardless of the material comprising the magnetic particles, generally, the higher the weight % of magnetic particle-to-membrane material weight—the stronger the field. Also, the smaller the magnetic particle, the better the permeate transfer properties through the membrane. Furthermore, magnetic ceramic material, such as Fe2O3, Fe3O4, magnetic materials such as lanthanum oxide ($La_2O_3$), strontium oxide (SrO), Co, $O_3$ may be used to create the membrane, which itself would give the membrane a more highly attractive magnetic characteristic.

In one embodiment, the magnetic nano or micro particles 90 preferably comprise a powder form, with each particle comprising a spherical particle in diameter from about 50 nm to about 300 micrometers, preferably from about 75 nm to about 200 micrometers, and more preferably from about 100 nm to about 100 micrometers. In another embodiment, the powder's particles are elongated to maximize the material's intrinsic shape anisotropy. Thus, the magnetic particles may either be anisotropic (a property that dependents on direction, and has a preferred direction of magnetization), or isotropic (properties with no directional dependence). Anisotropic particles, once formed within a hollow fiber membrane must be aligned radially. The magnetic field needed to orient the elongated magnetic can be created with a bucking field (as understood in the art). Thus, the membrane-embedded magnetic particles are magnetically aligned or magnetized to create a radially-shaped magnetic field having flux lines pointing outwardly from the center of the hollow fiber to attract, capture and/or position paramagnetic draw solute particles, located on the inside of the HFM, to the inside surface of the hollow fiber.

The magnetic particles preferably create a radial magnetic field, coaxial with the hollow center 30, which acts upon the hollow center's nanoparticle draw solution. Because magnetic particles are located close to the inner membrane layer 25, they attract the superparamagnetic nanoparticles of the draw solution to within close physical proximity of the inner surface 35 of the inner membrane layer 25 to maximize the effect of the nanoparticle solution as a draw solute. The radial magnetic field also counters the axial flow of the nanoparticle draw solution, thus preventing the paramagnetic nanoparticles of the solution from being swept along and out of the hollow center 30 with the pure water permeate.

Figure 2:
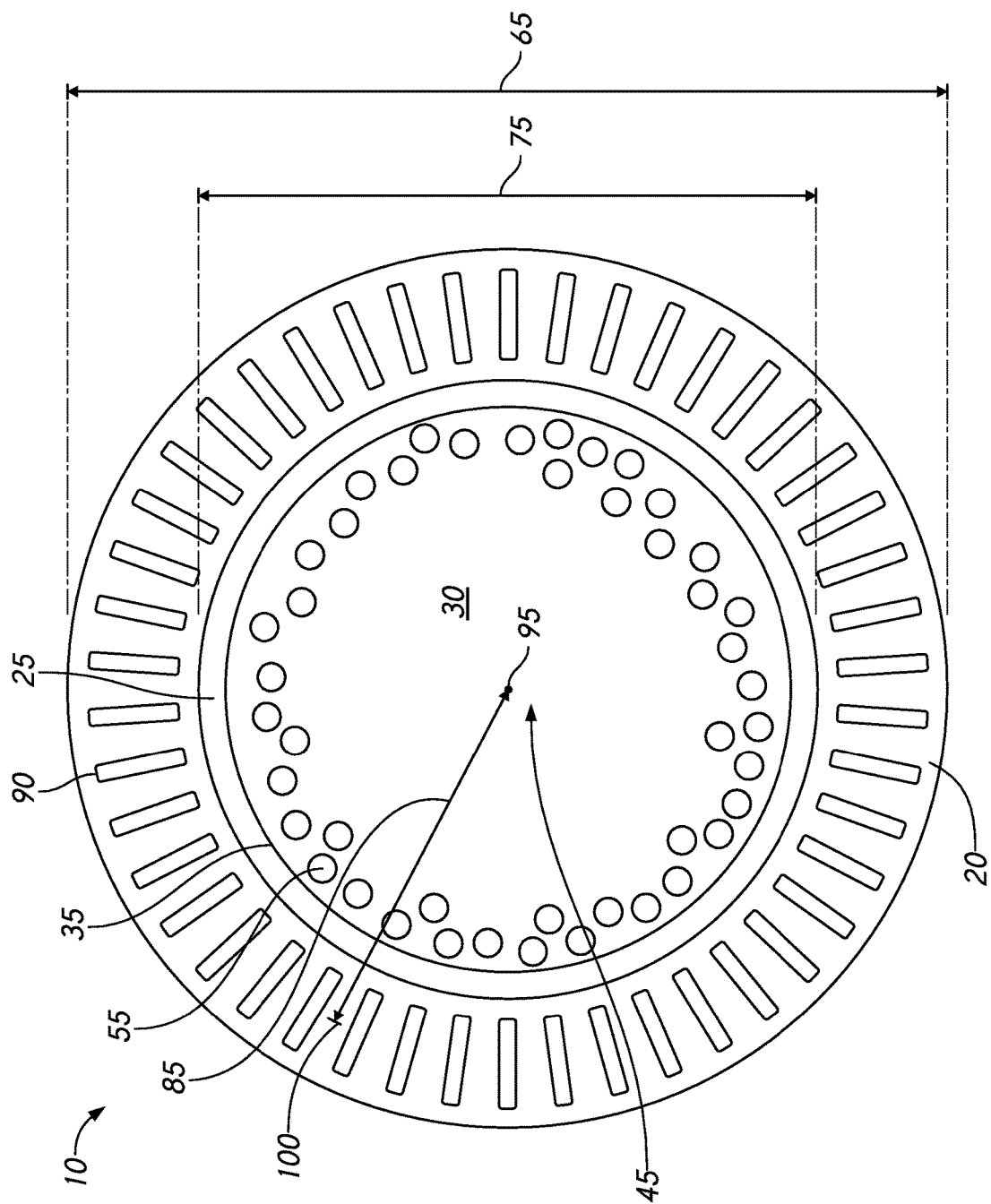
FIG. 2 is a sectional schematic view of the segment of FIG. 1, but also illustrating the superparamagnetic draw particles.

Referring to FIG. 2, by positioning the magnetic particles 90 within the outer layer 20 of the hollow fiber membrane 10, the distance between the magnetic particles (as a magnetic field source) and nanoparticle draw solution 45 is minimized over that existing between the draw solution and exterior magnet source (like those existing in the FO and PRO patents recited herein, infra). This minimal distance thus allows for the precise capture, control and/or manipulation of the superparamagnetic draw solution within the hollow center 30. Furthermore, because the minimal distance better attracts by superparamagnetic particles to the inner surface 35 of the inner membrane layer 25, it allows the particles to better counteract the force of the permeate flowing through the membrane layer that would otherwise push the magnetic nanoparticles away from the inner membrane layer itself (i.e., the so-called dilutive Concentration Polarization effect).

Referring again to FIG. 1, to shape the radial magnetic field, elongated embedded magnetic particles 90 are preferably utilized preferably having an aspect ratio of approximately 3 to 1 (about three times as long as it is wide), and having a much larger intrinsic shape anisotropy. The magnetic particle's elongated shape extends the resulting magnetic field shape further into the HFM to concentrate the magnetic field strength within the hollow fiber. These elongated particles, which favor a coherent rotation of the magnetization and thus large coercive fields (a trait largely absent in spherically-shaped magnetic particles) are preferably ellipsoidal or cylindrical in shape. However, although the magnetic powder preferably comprises particle of a single shape, it is understood that further embodiments may comprise a mixture of these shapes as well.

In another embodiment, the shape of the magnetic field is axial. An axial magnetic field is desirable where the permeate flow rate through and along the hollow center 30 is high. In a further embodiment, the hollow fiber membrane 10 utilizes both radial and axial magnetic fields, depending on the requirements of the particular paramagnetic nanoparticles and their position within the draw solution along the length of the hollow center 30. For example, if the position of the magnetic particles within the draw solution are close to the fiber's "dead end" (i.e., a point where the permeate flow velocity is low), the need to prevent its linear movement is relatively low. This would call for a radial field only that pulls the nanoparticle close to the fiber working surface and inner membrane layer 25. However, if the particles of the draw solution are positioned away from the dead end and/or in a relatively high permeate flow area, there would be a greater need for axial magnetic field strength.

The magnetic force of the magnetic particles 90 on magnetic nanoparticle solution is tuned or modulated by: 1) adjusting the relative concentration of the magnetic particles dispersed in the outer membrane layer 20; 2) adjusting the inside diameter of the HFM (the distance from the magnet-containing HFM wall to the magnetic nanoparticle); and/or 3) altering the outer membrane layer's thickness. Referring again to FIG. 2, the inner and outer diameters 75 and 65 of the outer membrane layer 20 of the multifunctional HFM are thus highly tunable, via a sizing of the inner diameter to as small as about 40 nm and the outer diameter to as large as about 522 micron (522,000 nm). This relatively wide range in diameters (from about 40 nm to about 522,000 nm) provides a very wide outer (magnetic particle-containing) layer, relative to the potential distance to the nanoparticle draw solute particles (about 20 nm, or about half of the 40 nm membrane center diameter).

The magnetic particles 90 of the outer membrane layer 20 thus may thus be used as an alternative to the various external, ring-type magnets described in U.S. Pat. No. 9,242,213 ("Forward Osmosis Using Magnetic Nanoparticle Draw Solutions") and U.S. Pat. No. 9,334,748 ("Pressure Retarded Osmosis System Using A Hollow Fiber Membrane With Superparamagnetic Nanoparticle Draw Solution"). The magnetic particles 90 may also be used in addition to the external magnets to increase the overall magnetic field acting on the draw solution, or in operable association with them such that the external magnets are used to re-energize any particles that lose their magnetic saturation over time.

Thus, the membrane-embedded magnetic field may be increased or decreased, (depending on the desired operational control) by an additional, external magnetic field. This system is known as High Gradient Magnetic Separation (HGMS, also called High Gradient Magnetic Field, HGMF). This is performed by activating or reversing a secondary, external magnetic field, described in the aforementioned patents and patent applications as ring-type magnets. The high gradient magnetic field provides a background magnetic field which is rearranged and focused with the membrane entrapped magnetic particles (at the local membrane surface) in order to produce a magnetic field that is greater than the sum of either of the original fields.

One reason to have this operational control feature is to increase (or tune) the membrane-embedded magnetic field strength to draw the solute particles toward the membrane with greater force in order to overcome the hydrodynamic force of the incoming (into the hollow fiber) permeate flow. Another reason is to reduce or reverse the magnetic field strength sufficiently in order to remove the draw solute particles from the hollow fibers. Such magnetic field strength reduction may occur in conjunction with hydraulic-sweep (using externally installed pumps) to remove the draw solute particles from the membrane surface area.

In further embodiments, electromagnets are utilized as the external magnet source such that they can be powered on and off to re-energize the particles. However, it is understood that any external magnets, be they electro-magnets or not, may be used to re-energize the magnetic particles 90 as needed through proximity changes of the external magnets in relation to the outer membrane layer 20.

The draw solute particles are preferably treated with a chemical dispersant that preferably creates a colloidal dispersion, enabling the dispersion to perform as a fluidized bed, while the hollow fiber's outside layer is highly water permeable to minimize permeate flow restriction and related minimize concentrative polarization effects. A colloidal dispersion of draw particles has significantly advantages in water over solutions or suspensions of the same. A brief review of the differences existing between a solution, colloidal dispersion, and a suspension thus highlights such advantages: 1) solution—dissolved, molecules, separate positive and negative ions, particle size; less than 1 nm, generates osmotic pressure, will not settle out, Brownian motion much more dominant than gravity; 2) colloidal dispersion—a colloid, it is of a particle size between that of a solution and a suspension, size=about 1 to about 1,000 nm, generates osmotic (oncotic) pressure, will not settle out because of Brownian motion, preferably comprised of nanoparticles; and 3) suspension—does NOT generate osmotic or oncotic pressure, particle size=greater than about 1,000 nm, it will settle out because the Brownian motion activity of the much smaller solvent particle is too small to impart enough force as a result of a collision to prevent gravity to become dominant.

Referring again to FIG. 2, a thin layer is comprised of between about 10% and about 50% (weight to weight % solids) of paramagnetic magnetic draw particles 55, only nanometers thick, (i.e., from about 2 nm to about 200 nm thick) positioned only at the inside surface 35 of the inner membrane layer 25 is sufficient to create the net osmotic/oncotic pressure differential to overcome the concentration gradient (for example, of the approximate 3.5% dissolved solids concentration of seawater). The about 10% to about 50% concentration of the magnetic draw dispersion is significantly higher than the approximate 3.5% salt concentration of seawater, ensuring seawater solvent membrane-transport.

The magnetic draw colloidal dispersion is not present elsewhere within and throughout the membrane system, not even at the center of the bore of the hollow fiber. It is intended that the concentration of the magnetic draw dispersion, within this very short-distance to the membrane layer, would exceed the concentration of the seawater salt, but that the overall system-wide concentration of the draw dispersion colloid would be much lower than the concentration of the dissolved salt in the seawater feed solution. Furthermore, since membrane-generated magnetic field magnetically pulls the colloidal magnetic draw dispersion against the inside surface of the hollow fiber membrane, it would counter-act the hydraulic drag force and dilutive effect of the incoming, membrane-transported permeate. Because the superparamagnetic draw colloidal dispersion can be positioned and captured at the membrane surface (and only at the membrane surface) there would not be the need to have a highly concentrated draw dispersion distributed throughout the membrane system.

There is operational significance of the relatively small, narrow diameter of the hollow fiber membrane. It is that the distance from the membrane-embedded magnetic particle to the magnetic colloidal particle within the hollow fiber, is small. Referring again to FIG. 2, the outer diameter 65 of the membrane outer membrane layer 20 is between about 400 µm (micrometers) and about 1,000 µm (about 1 mm). The approximate distance 85 from the middle 100 of the outer layer 20 to the center 95 of the hollow center 30 is between about 120 µm and about 400 µm; a relatively short distance. As the Inverse-Square Law dictates (that the magnetic intensity is inversely proportional to the square of the distance from the source of the magnetic field), the closer the source of the magnetic field is to the magnetic draw particles, the more energy efficient would be the control and capture of the magnetic draw particles (also, the smaller, the lighter and the cheaper, etc. would be the membrane system). Since the draw dispersion position would be controlled and maintained, there would be no negative effects of draw dilution (from the transfer of incoming permeate) and no need for a draw particle separation and regeneration process. The magnetic force of attraction that the magnetic colloidal draw dispersion has for the membrane embedded permanent magnetic particles thus captures and maintains the position the draw particle at the inside surface of the hollow fiber membrane and counteracts the hydraulic drag force and dilution effect of the incoming, membrane-transported permeate.

Therefore, the closer the source of the magnetic field is to the magnetic draw particles, the more energy efficient would be the control and capture of the magnetic draw particles, and the smaller the embedded magnetic particle force would need to be. With a smaller membrane embedded magnetic force, would come the smaller the embedded magnetic particle, the lower the membrane-magnetic particle concentration would need to be, the smaller the membrane diameter (the larger the surface area to volume ratio), and the smaller, cheaper and lighter the membrane could be designed and made.

While this foregoing description and accompanying figures are illustrative of the present invention, other variations in structure and method are possible without departing from the invention's spirit and scope.

I claim:

1. A multifunctional hollow fiber membrane for osmosis comprising:
an inner membrane layer defining a hollow center, the layer encircling and coaxial with the hollow center;
a tubular outer membrane layer encircling and coaxial with the inner membrane layer, the outer membrane layer embedded with a plurality of magnetic particles to create a magnetic force, the inner and outer membrane layers each having a porosity defined by a pore diameter size whereby the pore diameters defining the porosity of the inner membrane layer are less than the pore diameters defining the porosity of the outer membrane layer; and
wherein the hollow center contains a solution of superparamagnetic draw particles therein.

2. A multifunctional hollow fiber membrane for osmosis comprising:
an inner membrane layer defining a hollow center, the layer encircling and coaxial with the hollow center; and
a tubular outer membrane layer encircling and coaxial with the inner membrane layer, the outer membrane layer embedded with a plurality of magnetic particles to create a magnetic force, the inner and outer membrane layers each having a porosity defined by a pore diameter size whereby the pore diameters defining the porosity of the inner membrane layer are less than the pore diameters defining the porosity of the outer membrane layer; and wherein the hollow center contains a colloidal dispersion of superparamagnetic draw particles therein.

3. The multifunctional hollow fiber membrane of claim 2 wherein the distance from the middle of the outer membrane layer to the center of the hollow center is between about 120 micrometers and about 400 micrometers.

4. The multifunctional hollow fiber membrane of claim 1 wherein the magnetic force is variable.

5. The multifunctional hollow fiber membrane of claim 4 wherein the variable magnetic force defines a strength relative to a concentration of the plurality of magnetic particles.

6. The multifunctional hollow fiber membrane of claim 4 wherein the variable magnetic force defines a strength relative to a thickness of the outer membrane layer.

7. The multifunctional hollow fiber membrane of claim 6 wherein the thickness of the outer membrane layer is defined by an inner diameter no smaller than 40 nanometers and an outer diameter no larger than 522,000 nanometers.

8. The multifunctional hollow fiber membrane of claim 1 wherein the magnetic particles comprise spherical particles.

9. The multifunctional hollow fiber membrane of claim 8 wherein the spherical particles are from about 50 nanometers to about 300 micrometers in diameter.

10. The multifunctional hollow fiber membrane of claim 8 wherein the spherical particles are from about 75 nanometers to about 200 micrometers in diameter.

11. The multifunctional hollow fiber membrane of claim 8 wherein the spherical particles are from about 100 nanometers to about 100 micrometers in diameter.

12. The multifunctional hollow fiber membrane of claim 1 wherein the magnetic particles comprise elongated particles.

13. The multifunctional hollow fiber membrane of claim 12 wherein the elongated particles are about three times as long as they are wide.

14. The multifunctional hollow fiber membrane of claim 1 wherein the magnetic particles comprise both spherical and elongated particles.

15. The multifunctional hollow fiber membrane of claim 1 wherein the magnetic force is radial.

16. The multifunctional hollow fiber membrane of claim 1 wherein the magnetic force is axial.

17. The multifunctional hollow fiber membrane of claim 2 wherein the superparamagnetic draw particles are positioned only at an inside surface of the inner membrane layer.

18. The multifunctional hollow fiber membrane of claim 17 wherein draw solution is comprised of between about 10% and about 50% by weight of the superparamagnetic draw particles.

19. A multifunctional hollow fiber membrane for osmosis comprising:
an inner membrane layer defining a hollow center, the inner membrane layer encircling and coaxial with the hollow center, the hollow center containing a colloidal dispersion of superparamagnetic draw particles; and
a tubular outer membrane layer encircling and coaxial with the inner membrane layer, the outer membrane layer embedded with a plurality of elongated magnetic particles to create a radial magnetic force, the inner and outer membrane layers each having a porosity defined by a pore diameter size whereby the pore diameters defining the porosity of the inner membrane layer are less than the pore diameters defining the porosity of the outer membrane layer.

* * * * *